(12) United States Patent
Hayakawa et al.

(10) Patent No.: US 8,459,711 B2
(45) Date of Patent: Jun. 11, 2013

(54) FIVE-FINGERED HAND DEVICE

(75) Inventors: Masato Hayakawa, Wako (JP);
Kazuyuki Takahashi, Wako (JP);
Hironori Waita, Wako (JP); Hiroshi Gomi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 88 days.

(21) Appl. No.: 13/146,093

(22) PCT Filed: May 7, 2010

(86) PCT No.: PCT/JP2010/057822
§ 371 (c)(1),
(2), (4) Date: Jul. 25, 2011

(87) PCT Pub. No.: WO2010/131605
PCT Pub. Date: Nov. 18, 2010

(65) Prior Publication Data
US 2011/0288681 A1    Nov. 24, 2011

(30) Foreign Application Priority Data

May 14, 2009 (JP) ................................. 2009-117815
May 14, 2009 (JP) ................................. 2009-117816
May 14, 2009 (JP) ................................. 2009-117817
Sep. 10, 2009 (JP) ................................. 2009-208929
Sep. 10, 2009 (JP) ................................. 2009-208930
Sep. 10, 2009 (JP) ................................. 2009-208931
Sep. 10, 2009 (JP) ................................. 2009-208932

(51) Int. Cl.
*B25J 15/10*    (2006.01)
*B25J 13/08*    (2006.01)

(52) U.S. Cl.
USPC ................ 294/198; 294/907; 901/37; 901/46

(58) Field of Classification Search
USPC ............ 294/192, 198, 106, 213, 907; 901/37, 901/46
See application file for complete search history.

(56) References Cited

U.S. PATENT DOCUMENTS 3,694,021 A * 9/1972 Mullen .......................... 294/106
4,350,381 A * 9/1982 Hellmann ..................... 294/208
(Continued)

FOREIGN PATENT DOCUMENTS

JP    S47-044992    12/1972
JP    61-187689     11/1986
(Continued)

OTHER PUBLICATIONS

Machida, "Robotic Virtual System", Journal of the Society of Instrument and Control Engineers, The Society of Instrument and Control Engineers, vol. 43, including the partial English Translation, 7 pages, (Feb. 2004).

(Continued)

*Primary Examiner* — Dean Kramer
(74) *Attorney, Agent, or Firm* — Rankin, Hill & Clark LLP

(57) ABSTRACT

A five-fingered hand device suitably applicable to a humanoid robot is provided. The device includes a hand body (2) which has a base (4) and five finger mechanisms (5) to (9), a drive unit (3) which drives the finger mechanisms, and a control unit (36) which controls bending and stretching of the finger mechanisms. The drive unit (3) has driven fluid pressure cylinders provided inside the hand body (2) and driving fluid pressure cylinders (37) provided outside the hand body (2), the driven fluid pressure cylinders being connected to the driving fluid pressure cylinders via fluid pressure transmission pipes (45).

13 Claims, 8 Drawing Sheets

U.S. PATENT DOCUMENTS

| | | | |
|---|---|---|---|
| 4,667,475 A * | 5/1987 | Wesman | 60/537 |
| 4,733,895 A * | 3/1988 | Hawkes | 294/198 |
| 4,834,761 A * | 5/1989 | Walters | 623/26 |
| 5,447,403 A | 9/1995 | Engler, Jr. | |
| 7,221,120 B2 * | 5/2007 | Tadano | 318/567 |
| 8,182,010 B2 * | 5/2012 | Lee et al. | 294/198 |
| 2006/0028041 A1 | 2/2006 | Ono et al. | |

FOREIGN PATENT DOCUMENTS

| | | |
|---|---|---|
| JP | H03-005410 | 1/1991 |
| JP | 05-031688 | 2/1993 |
| JP | 05-057661 | 3/1993 |
| JP | 08-126984 | 5/1996 |
| JP | 08-197467 | 8/1996 |
| JP | 08-323675 | 12/1996 |
| JP | 10-138176 | 5/1998 |
| JP | 11-156778 | 6/1999 |
| JP | 2001-287182 | 10/2001 |
| JP | 2004-090193 | 3/2004 |
| JP | 2004-181585 | 7/2004 |
| JP | 2004-212152 | 7/2004 |
| JP | 2006-150422 | 6/2006 |
| JP | 2006-159320 | 6/2006 |
| JP | 2006-255805 | 9/2006 |
| JP | 2008-183629 | 8/2008 |
| WO | 2008/026574 | 3/2008 |

OTHER PUBLICATIONS

Mechanisms of a Humanoid Robot Hand, History of Developing Artful Mechanisms to Achieve a Pinching Function, Ichiro Kawabuchi and Kiyoshi Hoshino, pp. 57-62, English abstract included.

Machida, "Robotic Virtual System", Journal of the Society of Instrument and Control Engineers, The Society of Instrument and Control Engineers, vol. 43, 6 pages.

M.A.Diftler, et al Robonaut: A Robotic Astronaut Assistant, Proceeding of the 6th International Symposium on Artificial Intelligence and Robotics & Automation in Space, i-SAIRAS 2001, Jun. 18, 2001, 8 pages.

* cited by examiner

FIVE-FINGERED HAND DEVICE

TECHNICAL FIELD

The present invention relates to a five-fingered hand device which mimics a human hand.

BACKGROUND ART

Five-fingered hand devices which mimic a human hand are recently known. The five-fingered hand device of this type includes a base having a palm and a back, and a thumb mechanism, an index finger mechanism, a middle finger mechanism, a ring finger mechanism, and a little finger mechanism which correspond respectively to the five fingers of a human being. Each finger mechanism has a plurality of joints and is rotatable at each joint, so that it is able to perform bending and stretching operations (see Japanese Patent Application Laid-Open No. 2008-183629).

In the conventional hand device, a plurality of motors are used as drive units for driving the bending and stretching operations of the finger mechanisms. That is, each finger mechanism is provided with three joints, and the motors for moving the joints are arranged in the base. Wires are used to connect the motors with the finger mechanisms. As the motors cause the finger mechanisms to bend or stretch via the wires, a grasping operation and other operations are performed by the finger mechanisms.

In order for the motors to be housed in the base, however, the motors need to be relatively small in size. As a result, sufficient driving forces may not be obtained from the motors, or even when the motors can bend and stretch the finger mechanisms, a sufficient grasping force may not be obtained from the finger mechanisms.

To obtain a sufficiently large grasping force, it is conceivable to adopt motors having a relatively large driving force. In this case, however, the motors will be increased in size as well as in weight, leading to an increase in size of the base and the finger mechanisms. This hinders reduction in size and weight of the five-fingered hand device so as to approximate the size of a typical human hand, making it difficult to adapt the hand device to a humanoid robot having a build and shape equivalent to those of a human being.

DISCLOSURE OF THE INVENTION

Problem to be Solved by the Invention

In view of the foregoing, it is an object of the present invention to provide a five-fingered hand device which permits reduction in size and weight while implementing operations similar to those of a human hand and providing a sufficiently large grasping force, so that it can be suitably adapted to a humanoid robot.

Means for Solving the Problem

The present invention provides a five-fingered hand device including a hand body mimicking a human hand and a drive unit, the hand body including a base having a palm and a back, and a thumb mechanism, an index finger mechanism, a middle finger mechanism, a ring finger mechanism, and a little finger mechanism corresponding respectively to a human five fingers and each having bending and stretching functions, the drive unit driving the five finger mechanisms of the hand body independently of each other, wherein the drive unit includes: a plurality of driven fluid pressure cylinders installed in the hand body and actuating the finger mechanisms to bend and stretch independently of each other; a plurality of driving fluid pressure cylinders placed outside the hand body and connected via fluid pressure transmission pipes to the driven fluid pressure cylinders, respectively, the driving fluid pressure cylinders applying working fluid pressures to the driven fluid pressure cylinders independently of each other; and a control unit configured to adjust the working fluid pressures transmitted from the driving fluid pressure cylinders to the corresponding driven fluid pressure cylinders, to thereby control the bending and stretching of the finger mechanisms.

According to the present invention, the drive unit is configured with a plurality of driven fluid pressure cylinders and a plurality of driving fluid pressure cylinders connected to the respective driven fluid pressure cylinders. While the driven fluid pressure cylinders are installed in the hand body, the driving fluid pressure cylinders are provided outside the hand body, permitting a reduction in size of the hand body.

Further, the driven fluid pressure cylinders cause the finger mechanisms to bend and stretch by the working fluid pressures transmitted from the corresponding driving fluid pressure cylinders. Thus, as compared with the case where the finger mechanisms are driven by motors or the like, a sufficiently large grasping force can be generated despite the compact design.

In the present invention, the driving fluid pressure cylinder includes a first cylinder body which contains a fluid therein, a hollow first piston rod inserted into the first cylinder body from one end thereof and capable of advancing and retracting therein, a first piston provided consecutively to the first piston rod, a seal member which seals the first cylinder body while permitting advancing and retracting movement of the first piston, a ball screw inserted into the first piston rod along an axis line of the first piston rod, a nut fixedly secured to the first piston rod and screwed with the ball screw, and a rotary drive unit which rotationally drives the ball screw to cause the first piston rod to advance and retract via the nut, and the driven fluid pressure cylinder includes a second cylinder body which is supplied with a working fluid from the driving fluid pressure cylinder, a second piston which is reciprocally movable in the second cylinder body, and a second piston rod which is provided consecutively to the second piston and advances and retracts in accordance with the reciprocating motion of the second piston.

According to the above configuration, when the rotary drive unit rotationally drives the ball screw, the nut moves in accordance with the direction in which the ball screw rotates. With the nut fixedly secured to the first piston rod, the first piston moves together with the nut. With the movement of the first piston, a fluid pressure is produced in the first cylinder body, and the fluid pressure is applied to the second cylinder body of the driven fluid pressure cylinder, thereby actuating the second piston.

With this configuration, the first piston inside the first cylinder body can be moved to a desired position with accuracy, in accordance with the amount of rotation of the ball screw.

In the present invention, the first piston rod is hollow and the ball screw is inserted therein. When the first piston retracts, the ball screw is received in the first piston rod.

As a result, unlike the conventional configuration where the ball screw is provided consecutively to the piston, the length of the first piston rod can be made approximately equal to the entire length of the interior of the first cylinder body, while making the entire length of the driving fluid pressure cylinder relatively short to thereby achieve a compact construction.

Moreover, as the seal element is provided, the first cylinder body is reliably maintained in the sealed state while the first piston advances or retracts. This improves airtightness of the first cylinder body, whereby the fluid pressure is generated efficiently.

While a gas such as air or a liquid fluid such as oil may be used as the working fluid, in consideration of the responsiveness of the driving fluid pressure cylinder to the driving fluid pressure cylinder, it is desirable to use a liquid fluid such as oil, which is an incompressible fluid, as the working fluid.

Preferably, the rotary drive unit is provided adjacent to the first cylinder body in a posture where an output shaft thereof that outputs rotation is in parallel with an axis line of the first piston, and the output shaft is connected to the ball screw via a rotation transmit unit.

With this configuration, the output shaft of the rotary drive unit and the cylinder body are arranged in parallel with each other, leading to a compact construction of the driving fluid pressure cylinder with its entire length further reduced.

When a liquid fluid is adopted as the working fluid, in the event that air is mixed in the liquid fluid within the first cylinder body, the responsiveness of the driven fluid pressure cylinder to the driving fluid pressure cylinder may deteriorate. As the first cylinder body is sealed by the seal element, although it is possible to prevent air from entering therein, in case that the air that has entered from another place is mixed into the liquid fluid, it is difficult to expel the air out of the first cylinder body.

In view of the foregoing, preferably in the present invention, the drive unit uses a liquid fluid as the working fluid and has a fluid storage tank for storing the liquid fluid therein, the driving fluid pressure cylinder is arranged in a posture where the first piston retracts in an upward direction with the aforementioned one end of the first cylinder body being on an upper side, the first cylinder body has a receiving section at an upper end thereof, the receiving section being configured to receive a distal end of the retracted first piston in a non-contact state, and the receiving section has a through hole and an air bleeding hole, the through hole being connected to the fluid storage tank to let the liquid fluid flow therethrough, the air bleeding hole being formed above the through hole to expel air out of the first cylinder body.

With this configuration, even in the event that the air that has been mixed into the liquid fluid serving as the working fluid enters into the first cylinder body, it is readily possible to expel the air by simply causing the first piston to retract such that its distal end is received in the receiving section.

That is, the first cylinder body is provided in the posture where, with the one end thereof (from which the first piston is inserted) being on the upper side, the first piston retracts in the upward direction, so that the air inside the first cylinder body moves upward. When the first piston is retracted upward to let the distal end of the first piston received in the receiving section provided at the upper end of the first cylinder body, the air enters into between the receiving section and the distal end of the first piston. Then, the air that has entered into between the receiving section and the distal end of the first piston is guided from the air bleeding hole formed in the receiving section to the outside of the first cylinder body.

Further, the receiving section has the through hole formed therein, which is connected to the fluid storage tank. With this configuration, as the first piston is advanced downward, when the distal end thereof leaves the receiving section, the receiving section attains a negative pressure, causing the liquid fluid in the fluid storage tank to be sucked into the receiving section. As a result, the air in the receiving section is replaced with the liquid fluid, so that the receiving section can be filled with the liquid fluid. This avoids a reduction in filled amount of the liquid fluid inside the first cylinder body due to the expelled air.

Further, in the present invention, the second piston rod of the driven fluid pressure cylinder is formed of a metal, and the second piston of the driven fluid pressure cylinder is formed of a synthetic resin, the second piston rod and the second piston are joined together as a ball section formed at a proximal end portion of the second piston rod is fitted in a spherical receiving section formed at the second piston, and the second piston has an outer peripheral surface provided with a recess extending in a circumferential direction thereof, the recess being formed at least at a portion where an outer surface of the ball section fitted in the spherical receiving section comes closest to an inner surface of the second cylinder body.

The ball section of the second piston rod is fitted in the spherical receiving section of the second piston. This not only joins the second piston rod to the second piston, but also permits the second piston rod to freely swing relative to the second piston.

As the second piston rod is formed of a metal, it is high in strength. Particularly, forming the second piston rod with a light metal such as aluminum alloy permits a further reduction in weight.

Moreover, the second piston formed of a synthetic resin is compact and lightweight as is made by injection molding or the like. In addition, as the second piston is formed of a synthetic resin, the ball section can readily be press-fitted into the spherical receiving section, ensuring high workability in assembly.

The recess is formed on the outer peripheral surface of the second piston of the present invention. Thus, when the ball section is press-fitted into the spherical receiving section, even if the spherical receiving section is pushed and spread by the ball section, the recess is able to absorb the deformation of the second piston at that time.

This prevents the outer peripheral surface of the piston from bulging when the ball section is fitted in the spherical receiving section, thereby avoiding an increase in sliding resistance of the second piston with respect to the inner surface of the second cylinder body.

Furthermore, the recess formed on the outer peripheral surface of the second piston reduces the sliding-contact area of the outer peripheral surface of the second piston with respect to the inner surface of the second cylinder body, so that the sliding resistance is kept small. This ensures smooth reciprocating movement of the second piston inside the second cylinder body.

Preferably, in the present invention, the drive unit includes a first pressure sensor which measures an output fluid pressure output from the driving fluid pressure cylinder to the fluid pressure transmission pipe, and a second pressure sensor which measures an input fluid pressure input from the fluid pressure transmission pipe to the driven fluid pressure cylinder, and the control unit controls the bending and stretching of the finger mechanism by adjusting the working fluid pressure of the driving fluid pressure cylinder on the basis of the measurement results of the first and second pressure sensors.

With the first pressure sensor and the second pressure sensor being provided, the output fluid pressure of the working fluid generated in the driving fluid pressure cylinder and the input fluid pressure of the working fluid acting on the driven fluid pressure cylinder can be measured at the same time.

Further, by comparing the output fluid pressure measured by the first pressure sensor with the input fluid pressure measured by the second pressure sensor, the control unit is able to readily detect a deterioration of responsiveness for example due to the air mixing in the fluid flow path or due to the change in flow resistance of the fluid with the expansion/contraction of the diameter of the fluid pressure transmission pipe.

Then, in the event that such deterioration of responsiveness is detected, the control unit is able to immediately correct the actuation of the driving fluid pressure cylinder in response to the difference between the output fluid pressure and the input fluid pressure, thereby controlling the bending and stretching of the finger mechanism with high accuracy.

In the present invention, the four finger mechanisms other than the thumb mechanism each include a distal interphalangeal joint which rotates in one axis, a proximal interphalangeal joint which rotates in one axis about an axis line parallel to a rotary shaft of the distal interphalangeal joint, and a metacarpophalangeal joint which rotates in two axes about an axis line parallel to a rotary shaft of the proximal interphalangeal joint and an axis line crossing that axis line, the distal interphalangeal joint is joined via a link mechanism to the proximal interphalangeal joint so as to move in linkage with the rotation of the proximal interphalangeal joint, and the proximal interphalangeal joint and the metacarpophalangeal joint are joined to piston rods of the different driven fluid pressure cylinders separately, so as to rotate in accordance with extension and refraction of the corresponding piston rods.

With this configuration, the index finger mechanism, the middle finger mechanism, the ring finger mechanism, and the little finger mechanism, each having the one-axis distal interphalangeal joint, the one-axis proximal interphalangeal joint, and the two-axis metacarpophalangeal joint, can be actuated to bend and stretch in a similar manner as the human fingers. Moreover, the distal interphalangeal joints move in linkage with the proximal interphalangeal joints by the link mechanisms. This not only ensures natural motions similar to those of the human fingers, but also allows the distal interphalangeal joints to be rotated by the driven fluid pressure cylinders that rotate the proximal interphalangeal joints. This reduces the number of the driven fluid pressure cylinders, thereby permitting a reduction in size and weight of the finger mechanisms.

Preferably, the driven fluid pressure cylinder for rotating the proximal interphalangeal joint is arranged between the proximal interphalangeal joint and the metacarpophalangeal joint, and the driven fluid pressure cylinder for rotating the metacarpophalangeal joint is arranged in the base.

With this configuration, the driven fluid pressure cylinder for rotating the proximal interphalangeal joint can be housed inside the finger mechanism. This reduces the number of the driven fluid pressure cylinders arranged in the base, whereby the hand body can be made compact.

Moreover, as the driven fluid pressure cylinder for rotating the proximal interphalangeal joint is arranged between the proximal interphalangeal joint and the metacarpophalangeal joint, this driven fluid pressure cylinder can be used as an element corresponding to the human proximal phalanx. This improves space efficiency, and also reduces the number of parts, leading to a reduction in weight.

Further, in the present invention, the thumb mechanism includes a thumb interphalangeal joint which rotates in one axis, a thumb metacarpophalangeal joint which rotates in one axis about an axis line parallel to a rotary shaft of the thumb interphalangeal joint, and a carpometacarpal joint which rotates in two axes about an axis line parallel to a rotary shaft of the thumb metacarpophalangeal joint and an axis line crossing that axis line, the thumb interphalangeal joint is joined via a link mechanism to the thumb metacarpophalangeal joint so as to move in linkage with the rotation of the thumb metacarpophalangeal joint, and the thumb metacarpophalangeal joint and the carpometacarpal joint are joined to piston rods of the different driven fluid pressure cylinders separately, so as to rotate in accordance with extension and refraction of the corresponding piston rods.

With this configuration, the thumb mechanism, with the one-axis thumb interphalangeal joint, the one-axis thumb metacarpophalangeal joint, and the two-axis carpometacarpal joint, can be actuated to bend and stretch in a similar manner as the human thumb. Moreover, the thumb interphalangeal joint moves in linkage with the thumb metacarpophalangeal joint by the link mechanism. This not only ensures natural motions similar to those of the human thumb, but also allows the thumb interphalangeal joint to be rotated by the driven fluid pressure cylinder that rotates the thumb metacarpophalangeal joint. This reduces the number of the driven fluid pressure cylinders, thereby permitting a reduction in size and weight of the thumb mechanism.

Preferably, in the thumb mechanism of the present invention, the driven fluid pressure cylinder for rotating the thumb metacarpophalangeal joint is arranged between the thumb metacarpophalangeal joint and the carpometacarpal joint, and the driven fluid pressure cylinder for rotating the carpometacarpal joint is arranged in the base.

With this configuration, the driven fluid pressure cylinder for rotating the thumb metacarpophalangeal joint can be housed inside the thumb mechanism. This reduces the number of the driven fluid pressure cylinders arranged in the base, whereby the hand body can be made compact.

Still preferably, in the thumb mechanism of the present invention, the carpometacarpal joint includes a first rotary shaft having an axis line parallel to the rotary shaft of the thumb metacarpophalangeal joint and a second rotary shaft having an axis line crossing the axis line of the first rotary shaft, the first and second rotary shafts being joined to piston rods of the different driven fluid pressure cylinders separately, the second rotary shaft is hollow and arranged in the base, and the driven fluid pressure cylinder for rotating the first rotary shaft is housed inside the the second rotary shaft.

With this configuration, the driven fluid pressure cylinder for rotating the first rotary shaft of the carpometacarpal joint is housed inside the second rotary shaft. This permits a compact construction, while accomplishing smooth actuation of the carpometacarpal joint.

Further, preferably at this time, a coil spring is provided which biases against a driving direction by the driven fluid pressure cylinder which rotates the second rotary shaft, and the second rotary shaft is arranged inside the coil spring.

With this configuration, the coil spring augments the driving force in the other driving direction by the driven fluid pressure cylinder which rotates the second rotary shaft. This allows a compact cylinder having a relatively small driving force to be adopted as the driven fluid pressure cylinder for rotating the second rotary shaft. In addition, the second rotary shaft arranged inside the coil spring permits a further compact construction.

Further, preferably, the second rotary shaft of the carpometacarpal joint of the thumb mechanism of the present invention is arranged such that an axis line of the second rotary shaft extends through between the metacarpophalangeal joint of the index finger mechanism and the metacarpophalangeal joint of the middle finger mechanism.

With this configuration, in performing an operation of picking up an object, the fingertip of the thumb mechanism can be made to oppose a midpoint between the fingertip of the index finger mechanism and the fingertip of the middle finger mechanism with a small rotational operation about the second rotary shaft of the carpometacarpal joint. This permits stable grasping of the object, while suppressing an unnecessary moment about the second rotary shaft.

In the present invention, the thumb mechanism and one or both of the index finger mechanism and the middle finger mechanism are considered as dexterous fingers which are each provided with a force sensor configured to detect a force acting on a fingertip portion thereof and which are caused by the control unit to perform a dexterous operation including a pinching operation with the fingertips, and the finger mechanisms other than the dexterous fingers are considered as force fingers which are caused by the control unit to perform a force operation including a gripping operation in response to the operation of the dexterous fingers.

Here, the "dexterous finger" refers to a deft or nimble finger in a human hand that is used for performing delicate work such as a pinching operation, while the "force finger" refers to a finger in a human hand that is used for gripping and holding an object with a strong force as in the gripping operation or the like or for temporarily holding an object when switching the same from one hand to the other. Such role allotment to the human fingers in the grasping operation is based on the results of analysis of the motions of human hands and fingers conducted by the present inventors. Of the human fingers, the thumb and the index finger, or the thumb, the index finger, and the middle finger function as the dexterous fingers, while the ring finger and the little finger function as the force fingers.

In view of the foregoing, in the present invention, the thumb mechanism and one or both of the index finger mechanism and the middle finger mechanism are considered as the dexterous fingers, and the force sensor for detecting the force acting on the fingertip portion is provided only to the dexterous finger. With this configuration, the information from the force sensors can be used to control the forces at the fingertips of the dexterous fingers so as to enable delicate work with the dexterous fingers, while the force fingers can be reduced in weight without providing the force sensors.

Further, in the present invention, the metacarpophalangeal joints of the four finger mechanisms other than the thumb mechanism each include a first rotary shaft having an axis line parallel to a rotary shaft of the proximal interphalangeal joint and a second rotary shaft having an axis line crossing the axis line of the first rotary shaft, the metacarpophalangeal joint of the finger mechanism considered as the dexterous finger has both rotary shafts joined to piston rods of the different driven fluid pressure cylinders separately, and the metacarpophalangeal joint of the finger mechanism considered as the force finger has only the first rotary shaft joined to a piston rod of the driven fluid pressure cylinder, with the second rotary shaft rotating freely in accordance with the force operation.

With this arrangement, the metacarpophalangeal joint of the finger mechanism considered as the dexterous finger has its both rotary shafts driven by the corresponding driven fluid pressure cylinders, so that the finger mechanism serving as the dexterous finger can be moved not only in the bending and stretching directions, but also in the directions of the intervals between the finger mechanisms. This permits smooth dexterous operations.

On the other hand, the metacarpophalangeal joint of the finger mechanism considered as the force finger has its second rotary shaft rotated freely in accordance with the force operation. Thus, for example in the case of gripping an article, the force finger spontaneously moves in the direction of the interval between the finger mechanisms in accordance with the posture or shape of the article, so that an optimal force operation is performed. At the same time, it is unnecessary to provide a driven fluid pressure cylinder for rotating the second rotary shaft of the metacarpophalangeal joint of the finger mechanism serving as the force finger, permitting a reduction in size and weight of the hand body.

MODE FOR CARRYING OUT THE INVENTION

Figure 1:
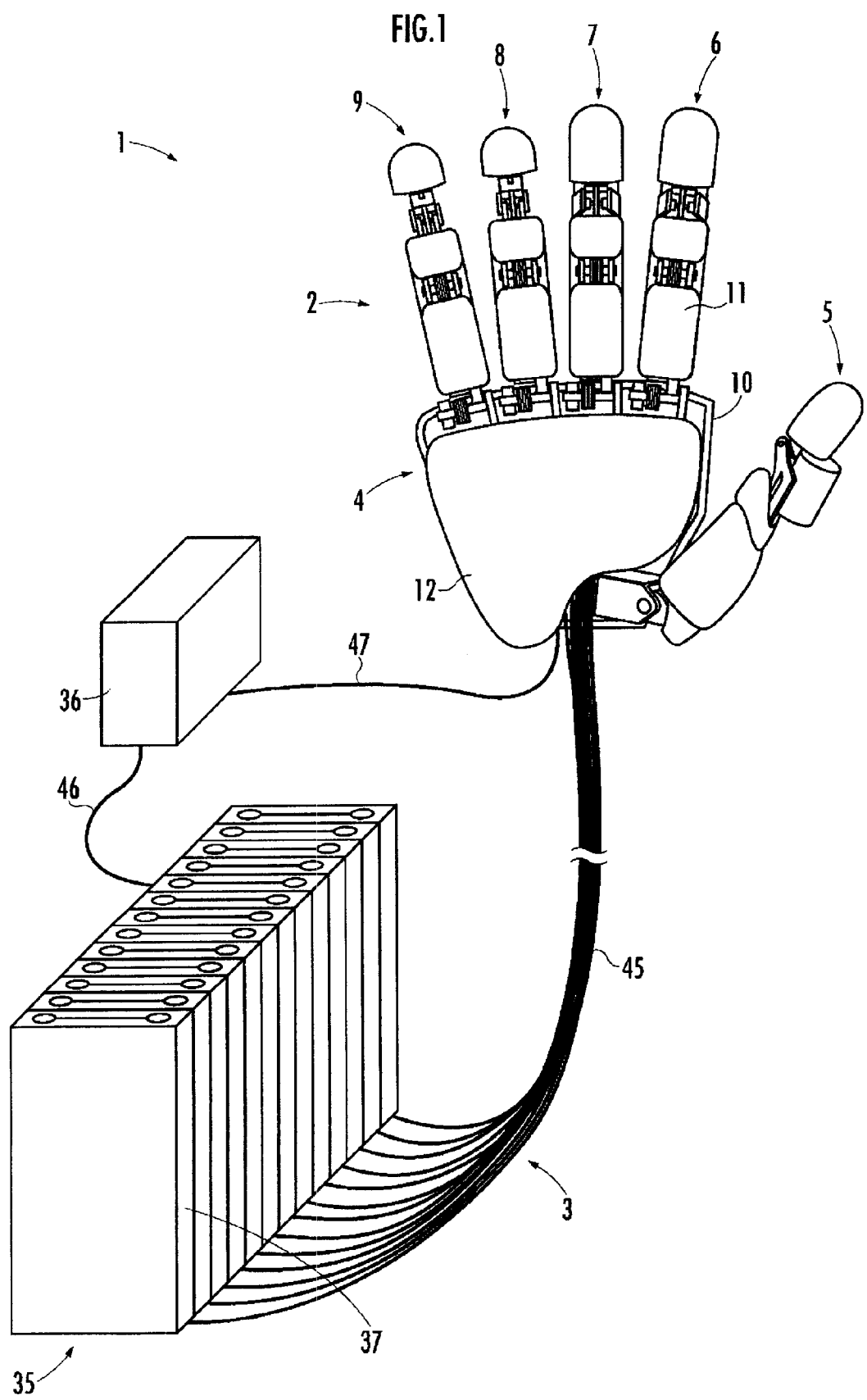
FIG. 1 is a schematic configuration diagram illustrating a five-fingered hand device according to an embodiment of the present invention.

An embodiment of the present invention will now be described with reference to the drawings. Referring to FIG. 1, a five-fingered hand device 1 according to the present embodiment is made up of a hand body 2 which mimics a human hand and a drive unit 3 which drives the hand body 2. The hand device is suitably applicable to a so-called humanoid robot.

The hand body 2 includes a base 4, and five finger mechanisms corresponding respectively to the five fingers, i.e. a thumb mechanism 5, an index finger mechanism 6, a middle finger mechanism 7, a ring finger mechanism 8, and a little finger mechanism 9, each having bending and stretching functions.

The base 4 has a frame 10 which joins and supports the finger mechanisms. The front side and the back side of the base 4 correspond to the back and the palm of the hand, respectively. FIG. 1 shows the palm side of the hand body 2.

Each finger mechanism is covered with a finger skin element 11, with the joints being exposed, and the base 4 is covered with a base skin element 12.

Figure 2:
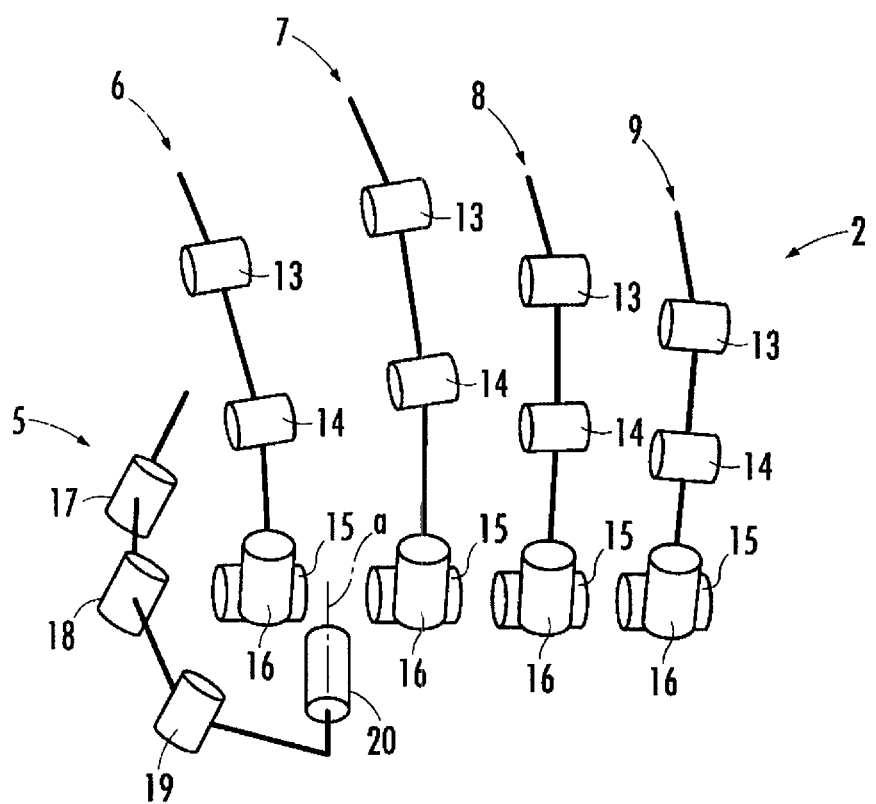
FIG. 2 schematically illustrates joints of a hand body.

As schematically illustrated in FIG. 2, each finger mechanism is provided with a plurality of phalanxes and a plurality of joints. The index finger mechanism 6, the middle finger mechanism 7, the ring finger mechanism 8, and the little finger mechanism 9 each include, in order from the fingertip side, a DIP joint 13 (the distal interphalangeal joint of the present invention), a PIP joint 14 (the proximal interphalangeal joint of the present invention), an MP1 joint 15, and an MP2 joint 16, to be rotatable at the respective joints.

The DIP joint 13 rotates in one axis, and the PIP joint 14 rotates in one axis about an axis line which is parallel to the DIP joint 13. The MP1 joint 15 and the MP2 joint 16 constitute the metacarpophalangeal joint of the present invention which rotates in two axes. The MP1 joint 15 rotates about an axis line which is parallel to the PIP joint 14, while the MP2 joint 16 rotates about an axis line which crosses the MP1 joint 15.

The DIP joint 13, the PIP joint 14, and the MP1 joint 15 are each configured to rotate in a direction toward the palm side of the base 4, so as to be able to perform a gripping operation and other bending and stretching motions. The MP2 joint 16 is configured to swing the corresponding finger mechanism in a direction toward or away from the neighboring finger mechanism, so as to enable an operation of spreading the hand, for example.

The thumb mechanism 5, as schematically illustrated in FIG. 2, includes, in order from the fingertip side, an IP joint 17 (the thumb interphalangeal joint of the present invention), an MP joint 18 (the thumb metacarpophalangeal joint of the present invention), a CM1 joint 19, and a CM2 joint 20, to be rotatable at the respective joints.

The IP joint 17 rotates in one axis, and the MP joint 18 rotates in one axis about an axis line which is parallel to the IP joint 17. The CM1 joint 19 and the CM2 joint 20 constitute the carpometacarpal joint which rotates in two axes. The CM1 joint 19 rotates about an axis line which is parallel to the MP joint 18, while the CM2 joint 20 rotates about an axis line which crosses the CM1 joint 19.

The IP joint 17, the MP joint 18, and the CM1 joint 19 are each configured to rotate in a direction toward the palm side of the base 4, or in a direction toward the finger pad side of any of the other four finger mechanisms 6, 7, 8, and 9, so as to be able to perform the gripping operation and other bending and stretching motions. The CM2 joint 20 is configured to rotate the thumb mechanism 5 so as to oppose the palm side or the finger pad side of any of the other four finger mechanisms 6, 7, 8, and 9.

Of the five finger mechanisms, three finger mechanisms of the thumb mechanism 5, the index finger mechanism 6, and the middle finger mechanism 7 are considered as dexterous fingers which perform dexterous operations including an operation of pinching an object with the fingertips, as will be described later, while the ring finger mechanism 8 and the little finger mechanism 9 are considered as force fingers which perform force operations including a gripping operation in accordance with the operations of the dexterous fingers.

The present inventors analyzed the motions of the human hands and fingers, and have found that the thumb, the index finger, and the middle finger are used for doing relatively delicate work, whereas the ring finger and the little finger are used for gripping and holding an object with relatively strong force, or for temporarily holding an object when switching the same from one hand to the other.

A human's operation of picking up a cylindrical object placed on a desk or the like will now be described by way of example. Firstly, the person touches the object with the thumb, the index finger, and the middle finger to confirm the posture of the object and, at the same time, corrects its posture so as to be able to easily grip the same by adjusting the amounts of forces applied by the thumb, the index finger, and the middle finger.

Then, the person pinches the object with the fingertips of the thumb, the index finger, and the middle finger, to pick up the object (pinching operation). At this time, the ring finger and the little finger start to grip the object, causing transition from grasping with the thumb, the index finger, and the middle finger to grasping with the ring finger and the little finger.

Thereafter, the ring finger and the little finger firmly grip the object with relatively strong force (gripping operation), with the thumb, the index finger, and the middle finger additionally gripping the object, to thereby complete the operation of picking up the object. The pickup operation as described above is performed successively and quickly in a seamless manner.

Figure 3:
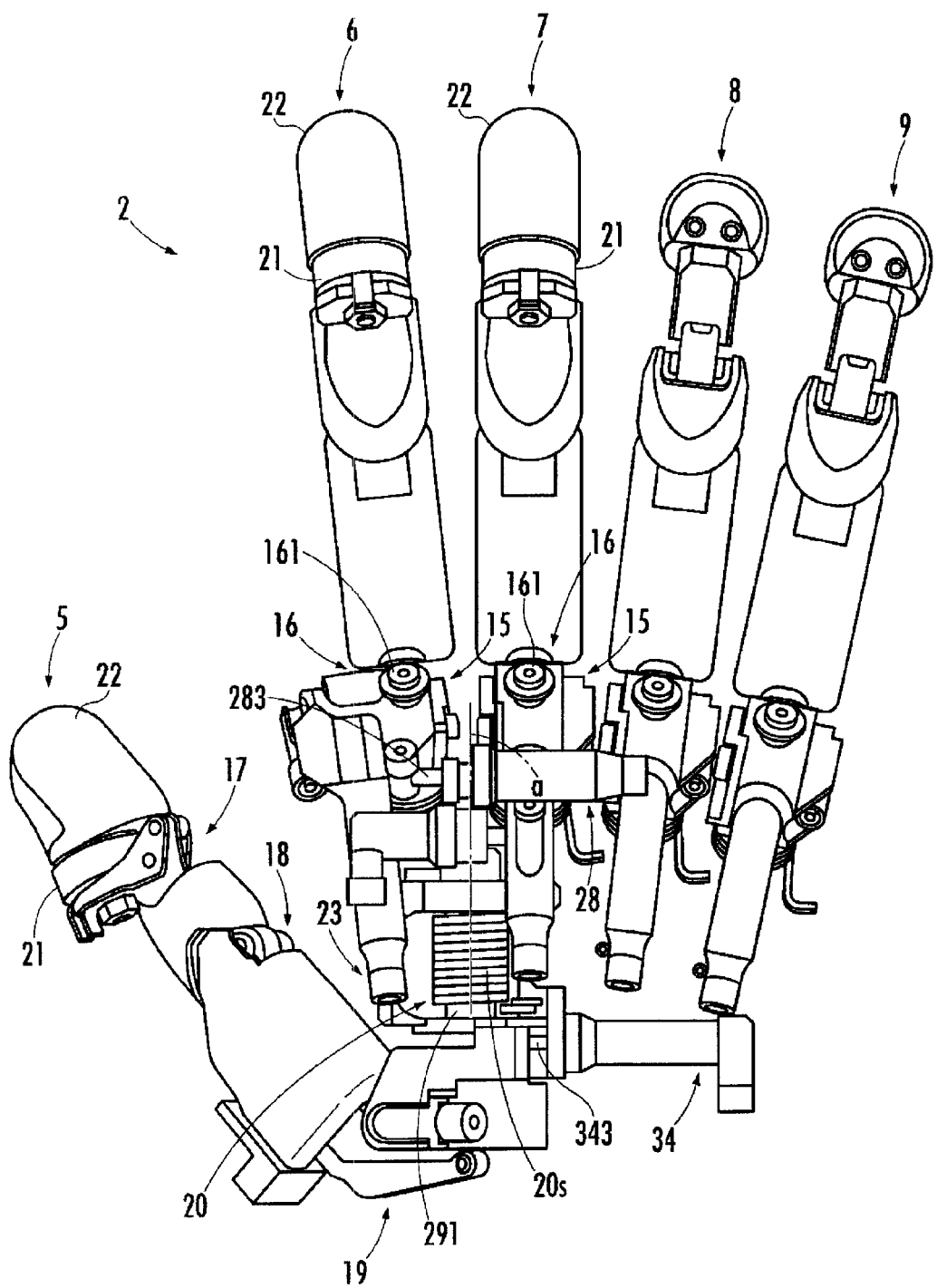
FIG. 3 illustrates the internal structure of the hand body as seen from the back of the hand.
Figure 4:
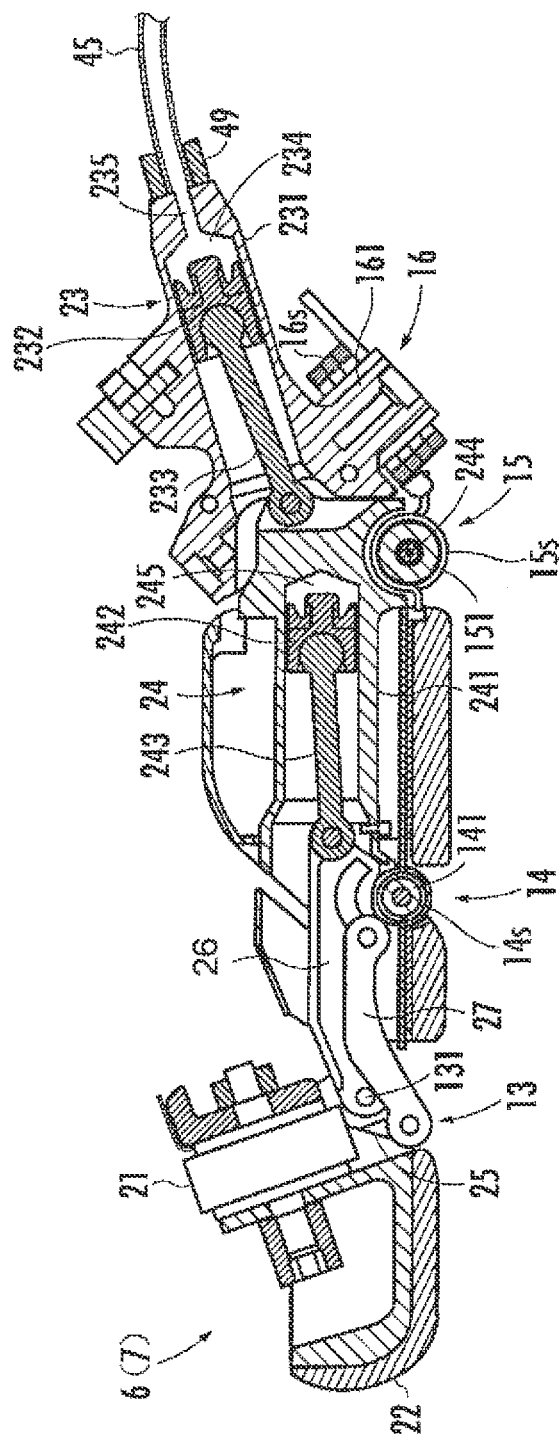
FIG. 4 is an illustrative cross-sectional view of a finger mechanism included in the hand body.

The thumb mechanism 5, the index finger mechanism 6, and the middle finger mechanism 7, which are considered as the dexterous fingers, are each provided with a force sensor, i.e. a six-axis force sensor 21, as shown in FIGS. 3 and 4. The six-axis force sensor 21 is attached, with a tilt, to a fingertip element 22 of each of the thumb mechanism 5, the index finger mechanism 6, and the middle finger mechanism 7. The six-axis force sensor 21 measures six axial forces acting on the fingertip element 22 of the dexterous finger, i.e. the translational forces in mutually orthogonal directions of three axes (x axis, y axis, and z axis), and the moments about the respective axes. The forces at the fingertips of the dexterous fingers are controlled on the basis of the measurement values of the six axial forces output from the six-axis force sensors 21.

The configuration of the index finger mechanism 6 will now be described. Referring to FIG. 4, the index finger mechanism 6 is provided with a first driven fluid pressure cylinder 23 which rotates a rotary shaft 151 of the MP1 joint 15 (the first rotary shaft of the metacarpophalangeal joint) and a second driven fluid pressure cylinder 24 which rotates a rotary shaft 141 of the PIP joint 14.

The first driven fluid pressure cylinder 23 has a cylinder body 231 which corresponds to a human metacarpal bone. The cylinder body 231 is rotatably supported by a rotary shaft 161 of the MP2 joint 16 (the second rotary shaft of the metacarpophalangeal joint) on the frame 10 of the base 4 (see FIG. 1). The second driven fluid pressure cylinder 24 has a cylinder body 241 which corresponds to a human proximal phalanx. The cylinder body 241 is rotatably joined to the first driven fluid pressure cylinder 23 via the rotary shaft 151 of the MP1 joint 15.

The rotary shaft 151 of the MP1 joint 15 houses therein a pipe 244 for supplying a fluid to the cylinder body 241 of the second driven fluid pressure cylinder 24. This prevents the pipe 244 from interfering with the rotation of the MP1 joint 15, thereby ensuring smooth bending and stretching operations of the index finger mechanism 6.

Further, the cylinder body 241 of the second driven fluid pressure cylinder 24 is arranged between the MP1 joint 15 and the PIP joint 14 along the longitudinal direction of the index finger mechanism 6, resulting in a compact construction of the index finger mechanism 6.

The DIP joint 13 is joined to the PIP joint 14 via a joining element 25 which corresponds to a human middle phalanx. The DIP joint 13 has its rotary shaft 131 rotatably joined to a support element 26 which supports the six-axis force sensor 21 provided consecutively to the fingertip element 22. The joining element 25 has its one end rotatably joined to the rotary shaft 141 of the PIP joint 14, and the other end joined to the rotary shaft 131 of the DIP joint 13.

A link element 27 is also provided between the PIP joint 14 and the DIP joint 13. The link element 27 joins the cylinder body 241 of the second driven fluid pressure cylinder 24 to the support element 26 supporting the six-axis force sensor 21 of the fingertip element 22.

The first driven fluid pressure cylinder 23 has a piston 232 (the second piston of the present invention) which slides as a hydraulic oil being a fluid is supplied into the cylinder body 231 (the second cylinder body of the present invention) to cause a piston rod 233 (the second piston rod of the present invention) to extend or refract, to thereby rotate the MP1 joint 15. This causes the index finger mechanism 6 to bend or stretch via the MP1 joint 15.

The second driven fluid pressure cylinder 24 has a piston 242 (the second piston of the present invention) which slides as a hydraulic oil being a fluid is supplied into the cylinder body 241 (the second cylinder body of the present invention) to cause a piston rod 243 (the second piston rod of the present invention) to extend or retract, to thereby rotate the PIP joint 14. At this time, as the PIP joint 14 is joined to the DIP joint 13 via the joining element 25 and the link element 27, the DIP joint 13 rotates following the rotation of the PIP joint 14 by the second driven fluid pressure cylinder 24.

The DIP joint 13 is configured to move in linkage with the rotation of the PIP joint 14 by the second driven fluid pressure cylinder 24, by means of the joining element 25 and the link element 27. This not only enables operations similar to those of a human finger, but also eliminates the need of a cylinder or the like for driving the DIP joint 13, thereby permitting a reduction in weight of the index finger mechanism 6.

With the configuration described above, the index finger mechanism 6 attains a bent state when the piston rods 233 and 243 of the first driven fluid pressure cylinder 23 and the second driven fluid pressure cylinder 24 are extended, while it attains a stretched state when the piston rods 233 and 243 are retracted.

The MP2 joint 16 of the index finger mechanism 6, as shown in FIG. 3, is rotated by a third driven fluid pressure cylinder 28 which has a piston rod 283 that extends and retracts in the direction in which the finger mechanisms are arranged. The third driven fluid pressure cylinder 28 causes the piston rod 283 to extend so as to swing the index finger mechanism 6 in the direction toward the middle finger mechanism 7, while it causes the piston rod 283 to retract so as to swing the index finger mechanism 6 in the direction away from the middle finger mechanism 7.

As shown in FIG. 4, the PIP joint 14, the MP1 joint 15, and the MP2 joint 16 are provided with coil springs 14s, 15s, and 16s, respectively (torsion springs). The coil springs 14s and 15s of the PIP joint 14 and the MP1 joint 15 each bias the index finger mechanism 6 in a stretching direction.

The coil spring 16s of the MP2 joint 16 biases the index finger mechanism 6 in the direction away from the middle finger mechanism 7. In other words, the biasing directions of the respective coil springs 14s, 15s, and 16s are set to be the same as the refracting directions of the piston rods 233, 243, and 283 of the three driven fluid pressure cylinders 23, 24, and 28.

The configuration of the index finger mechanism 6 as the dexterous finger has been described above in detail. The configuration of the middle finger mechanism 7, which is also the dexterous finger, is identical to that of the index finger mechanism 6.

The ring finger mechanism 8 and the little finger mechanism 9, which are considered as the force fingers, each have a configuration identical to the above-described configuration of the index finger mechanism 6, except that the six-axis force sensor 21 and the third driven fluid pressure cylinder 28 are not provided. With the lack of the third driven fluid pressure cylinder 28, the ring finger mechanism 8 and the little finger mechanism 9 each have the MP2 joint 16 rotate freely in accordance with the force operations, and each spontaneously return to its prescribed position by being biased by the coil spring 16s of the MP2 joint 16.

Figure 5:
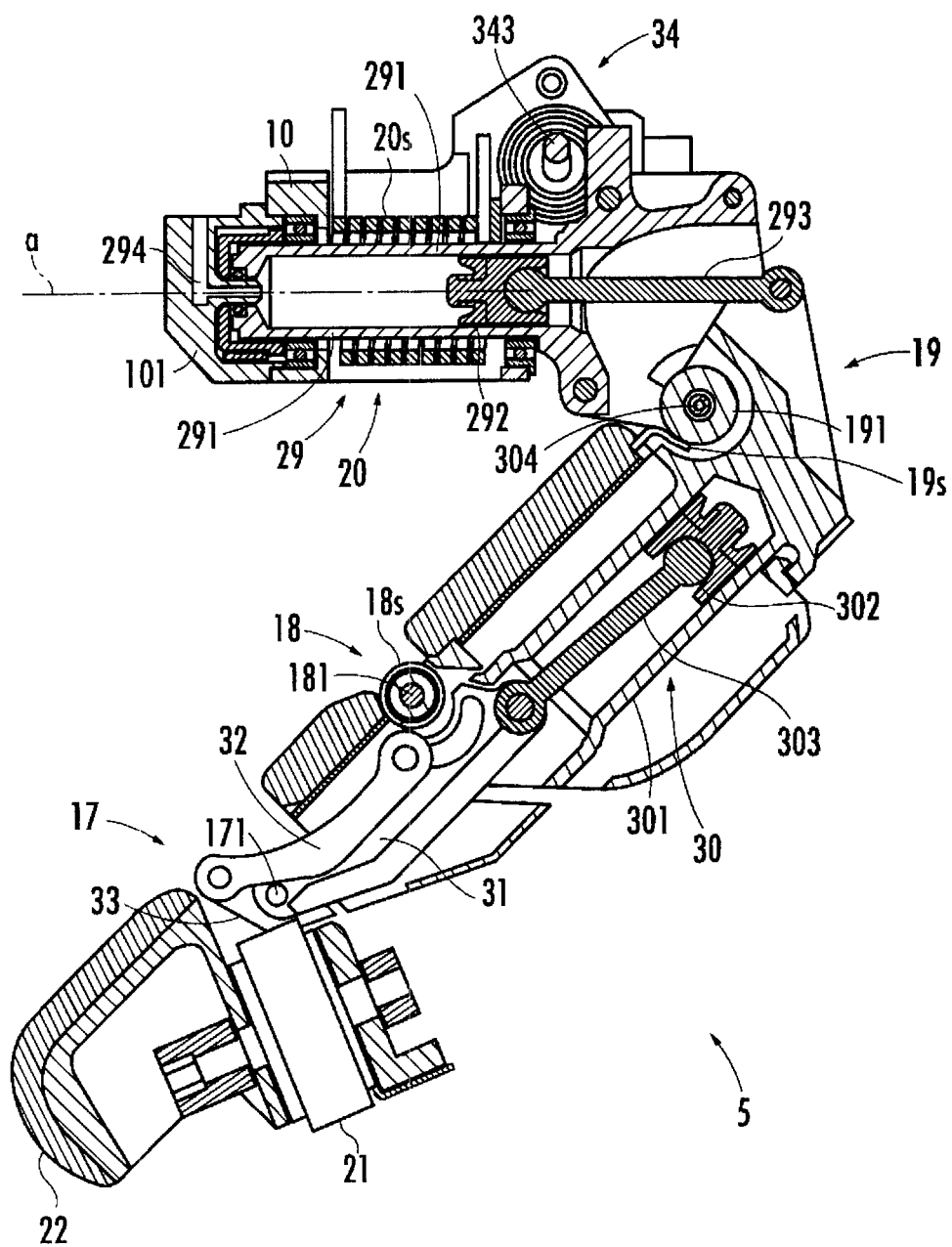
FIG. 5 is an illustrative cross-sectional view of a thumb mechanism included in the hand body.

The configuration of the thumb mechanism 5 which is considered as the dexterous finger will now be described. Referring to FIG. 5, the thumb mechanism 5 is provided with a first driven fluid pressure cylinder 29 which rotates a rotary shaft 191 of the CM1 joint 19 (the first rotary shaft of the carpometacarpal joint), and a second driven fluid pressure cylinder 30 which rotates a rotary shaft 181 of the MP joint 18.

The first driven fluid pressure cylinder 29 has a cylinder body 291 which serves as a rotary shaft of the CM2 joint 20 (the second rotary shaft of the carpometacarpal joint). The cylinder body 291 is rotatably supported by the frame 10 of the base 4.

As shown in FIGS. 2 and 5, the rotary shaft of the CM2 joint 20 (the cylinder body 291 of the first driven fluid pressure cylinder 29) is arranged such that its axis line "a" extends, preferably centrally, through between the metacarpophalangeal joint of the index finger mechanism 6 and the metacarpophalangeal joint of the middle finger mechanism 7, toward the direction of the fingertips of the index finger mechanism 6 and the middle finger mechanism 7 in their stretched states.

With this arrangement, in an operation of pinching an object, the fingertip of the thumb mechanism 5 can be made to oppose a midpoint between the fingertip of the index finger mechanism 6 and that of the middle finger mechanism 7, with a small rotational operation about the CM2 joint 20. Moreover, the fingertip of the thumb mechanism 5 can be made to oppose either one of the fingertips of the index finger mechanism 6 and the middle finger mechanism 7 in a balanced manner.

Accordingly, it is possible to stably grasp an object, while suppressing an unnecessary moment about the CM2 joint 20. Further, the measurement values obtained by the six-axis force sensors 21 are improved in accuracy, thereby permitting highly accurate control of the forces at the fingertips of the dexterous fingers.

Furthermore, as shown in FIG. 5, the cylinder body 291 of the first driven fluid pressure cylinder 29 also serves as the rotary shaft of the CM2 joint 20, leading to a compact construction as compared with the case where the first driven fluid pressure cylinder 29 and the rotary shaft of the CM2 joint 20 are provided separately. Moreover, the rotation of the CM2 joint 20 yields no swinging of the first driven fluid pressure cylinder 29, eliminating the need for its swinging space. This permits an extremely compact construction.

The second driven fluid pressure cylinder 30 has a cylinder body 301 which is rotatably joined to the first driven fluid pressure cylinder 29 via the rotary shaft 191 of the CM1 joint 19.

The rotary shaft 191 of the CM1 joint 19 houses therein a pipe 304 for supplying a fluid to the cylinder body 301 of the second driven fluid pressure cylinder 30. This prevents the pipe 304 from interfering with the rotation of the CM1 joint 19, thereby ensuring smooth bending and stretching operations of the thumb mechanism 5.

The MP joint 18 is joined to the IP joint 17 via a joining element 31. The fingertip element 22 is rotatably joined to a rotary shaft 171 of the IP joint 17. The joining element 31 has its one end rotatably joined to the rotary shaft 181 of the MP joint 18 and the other end joined to the rotary shaft 171 of the IP joint 17.

Further, a link element 32 is provided between the MP joint 18 and the IP joint 17. The link element 32 joins the cylinder body 301 of the second driven fluid pressure cylinder 30 to a support element 33 which supports the six-axis force sensor 21 of the fingertip element 22.

The first driven fluid pressure cylinder 29 has a piston 292 which slides as a fluid is supplied into the cylinder body 291 to cause a piston rod 293 to extend or retract, to thereby rotate the CM1 joint 19. This causes the thumb mechanism 5 to bend or stretch via the CM1 joint 19.

The second driven fluid pressure cylinder 30 has a piston 302 which slides as a fluid is supplied into the cylinder body 301 to cause a piston rod 303 to extend or refract, to thereby rotate the MP joint 18. At this time, as the MP joint 18 is joined to the IP joint 17 via the joining element 31 and the link element 32, the IP joint 17 rotates following the rotation of the MP joint 18 by the second driven fluid pressure cylinder 30.

The IP joint 17 is configured to move in linkage with the rotation of the MP joint 18 by the second driven fluid pressure cylinder 30. This not only enables operations similar to those of a human finger, but also eliminates the need of a cylinder or the like for driving the IP joint 17, thereby permitting a reduction in weight of the thumb mechanism 5.

With the configuration described above, the thumb mechanism 5 attains a bent state when the piston rods 293 and 303 of the first driven fluid pressure cylinder 29 and the second driven fluid pressure cylinder 30 are extended, while it attains a stretched state when the piston rods 293 and 303 are retracted.

The CM2 joint 20 of the thumb mechanism 5, as shown in FIG. 3, is rotated by a third driven fluid pressure cylinder 34 which has a piston rod 343 that extends and refracts in the direction in which the finger mechanisms are arranged.

The thumb mechanism 5 rotates in the direction toward the palm side of the base 4 as the piston rod 343 of the third driven fluid pressure cylinder 34 is extended, while the thumb mechanism 5 rotates in the direction adjoining the index finger mechanism 6 as the piston rod 343 of the third driven fluid pressure cylinder 34 is refracted.

As shown in FIG. 5, a fluid is supplied to the cylinder body 291 of the first driven fluid pressure cylinder 29 via a fluid passage 294 which is formed inside a bearing section 101 of the cylinder body 291 of the first driven fluid pressure cylinder 29 serving as the rotary shaft of the CM2 joint 20.

This enables the cylinder body 291 of the first driven fluid pressure cylinder 29 to rotate smoothly, thereby ensuring a smooth rotation of the thumb mechanism 5 by the CM2 joint 20.

As shown in FIGS. 3 and 5, the MP joint 18, the CM1 joint 19, and the CM2 joint 20 are provided with coil springs 18s, 19s, and 20s, respectively (torsion springs).

The coil springs 18s and 19s of the MP joint 18 and the CM1 joint 19 each bias the thumb mechanism 5 in a stretching direction. The coil spring 20s of the CM2 joint 20, provided to surround the outer periphery of the cylinder body 291 of the first driven fluid pressure cylinder 29, biases the thumb mechanism 5 in the direction to rotate to adjoin the index finger mechanism 6. In other words, the biasing directions of the respective coil springs 18s, 19s, and 20s are set to be the same as the refracting directions of the piston rods 293, 303, and 343 of the three driven fluid pressure cylinders 29, 30, and 34.

A plurality of touch sensors, not shown, are provided at prescribed positions on the finger skin elements 11 covering the finger pads of the hand body 2 as well as on the base skin element 12 covering the palm side of the hand.

Hereinafter, a preferable configuration adopted for each of the driven fluid pressure cylinders 23, 24, 28, 29, 30, and 34, the illustration of which has been omitted in FIGS. 4 and 5, will be described.

Figure 6:
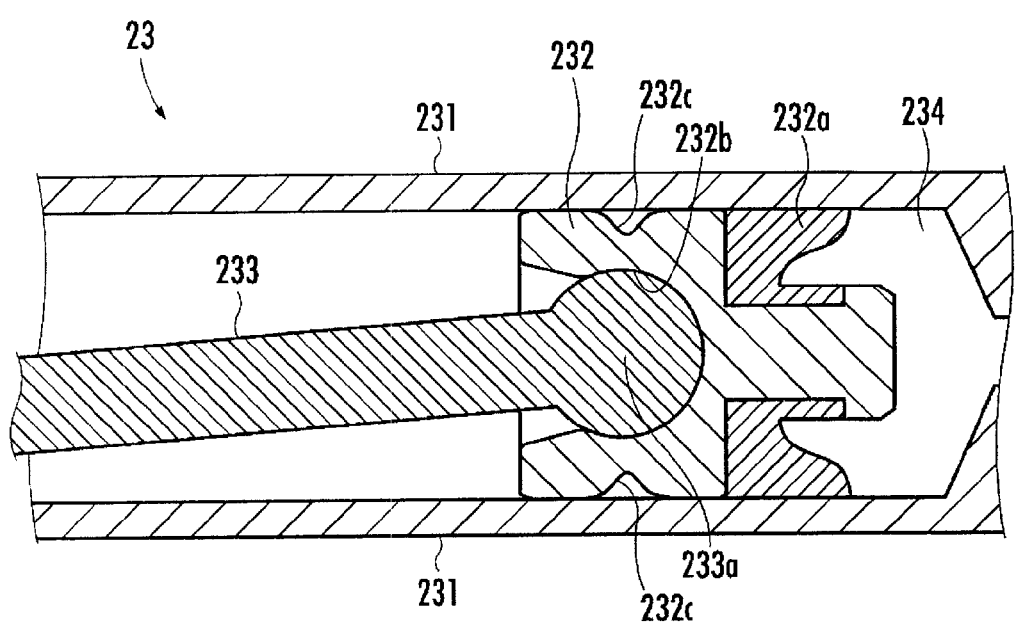
FIG. 6 is an enlarged cross-sectional view of part of a finger mechanism.

FIG. 6 is an enlarged view of part of the driven fluid pressure cylinder 23. Referring to FIG. 6, the piston 232 of the driven fluid pressure cylinder 23 is formed of a synthetic resin (for example, polyether ether ketone resin), and is provided with a gasket 232a which seals a pressure chamber 234 of the cylinder body 231 as shown in FIG. 6.

Further, a spherical receiving section 232b is formed inside the piston 232. On the outer peripheral surface of the piston 232 which is in sliding contact with the inner surface of the cylinder body 231, a recess 232c having a V shape in cross section is formed in the circumferential direction.

The piston rod 233 of the driven fluid pressure cylinder 23 is formed of a metal (for example, light metal such as aluminum alloy), and has a ball section 233a at its proximal end, as shown in FIG. 6. The ball section 233a is fitted in the spherical receiving section 232b of the piston 232 so as to be swingably joined to the piston 232.

The recess 232c is formed on the outer peripheral surface of the piston 232 at least in the portion where the outer surface of the ball section 233a fitted in the spherical receiving section 232b comes closest to the inner surface of the cylinder body 231 (i.e., in the portion that is most susceptible to deformation due to the ball section 233a fitted into the spherical receiving section 232b).

The recess 232c formed on the outer peripheral surface of the piston 232 as described above is advantageous in that, when the ball section 233a of the piston rod 233 is press-fitted into the spherical receiving section 232b, even if the spherical receiving section 232b is pushed and spread by the ball section 233a, the recess 232c is able to absorb the deformation of the piston 232 at that time.

This prevents the outer peripheral surface of the piston 232 from bulging when the ball section 233a is fitted in the spherical receiving section 232b, thereby avoiding an increase in sliding resistance of the piston 232 with respect to the inner surface of the cylinder body 231. Furthermore, the recess 232c formed on the outer peripheral surface of the piston 232 reduces the sliding-contact area of the outer peripheral surface of the piston 232 with respect to the inner surface of the cylinder body 231, so that the sliding resistance is kept small. This ensures smooth reciprocating movement of the piston 232 inside the cylinder body 231. It is noted that the cross-sectional shape of the recess 232c is not restricted to the V shape; it may be for example a U shape.

Although not shown in detail, the other driven fluid pressure cylinders 24, 28, 29, 30, and 34 each have the similar configuration and are able to obtain the effects similar to those of the driven fluid pressure cylinder 23.

The above is the description of the configuration of the hand body 2. Hereinafter, the drive unit 3 configured to drive the finger mechanisms of the hand body 2 will be described.

Referring to FIG. 1, the drive unit 3 is made up of a driving cylinder unit 35 provided outside the hand body 2, a controller 36 (the control unit of the present invention) which controls the hand body 2 via the driving cylinder unit 35, and the above-described driven fluid pressure cylinders 23, 24, 28, 29, 30, and 34.

The driving cylinder unit 35 includes a plurality of driving fluid pressure cylinders 37, as shown in FIG. 1.

Figure 7:
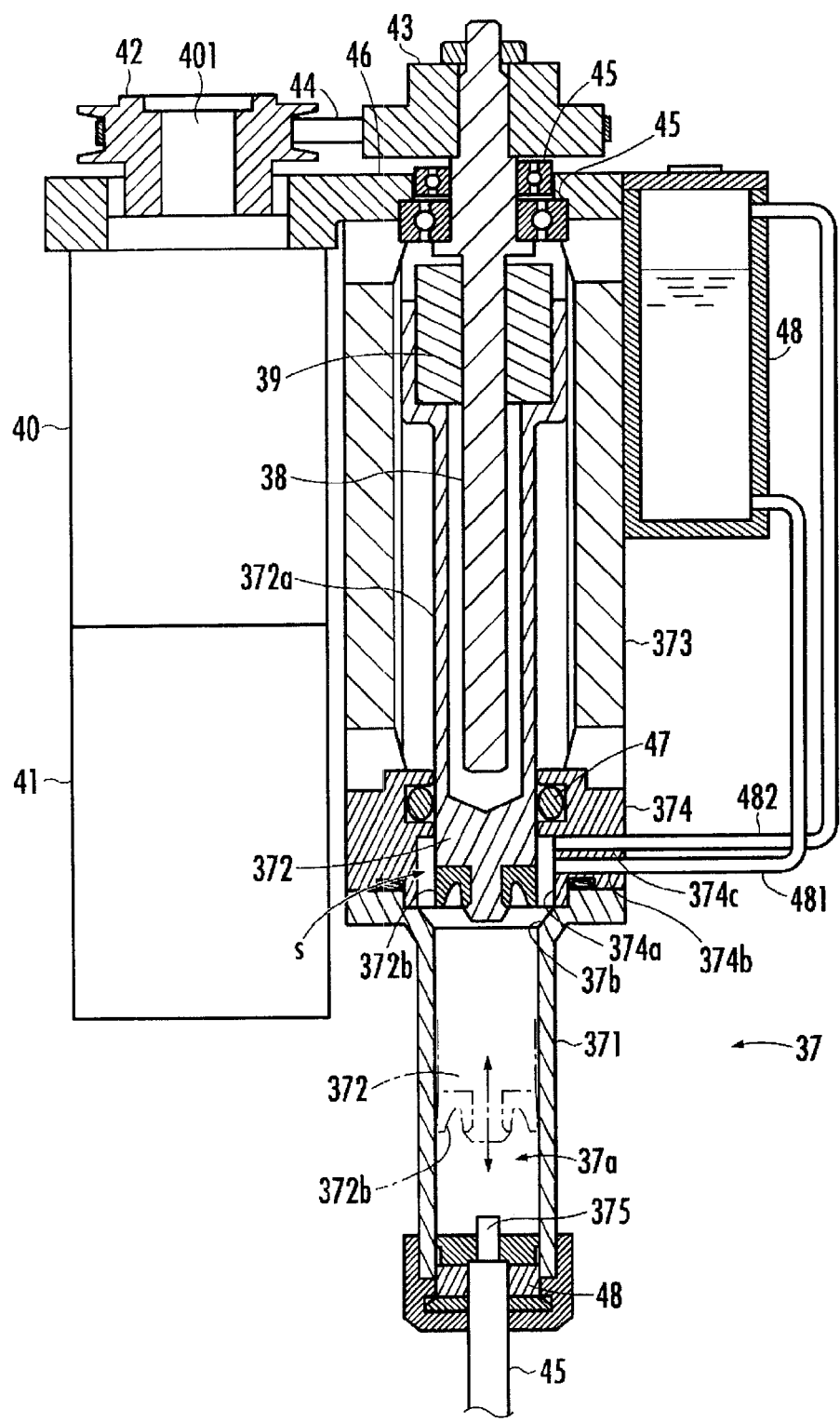
FIG. 7 schematically illustrates the configuration of part of a drive unit according to the present embodiment.

The driving fluid pressure cylinder 37, as shown in FIG. 7, has a cylinder body 371 (the first cylinder body of the present invention) which contains therein a hydraulic oil serving as a working fluid, and a piston 372 (the first piston of the present invention) which is reciprocally movable while forming a pressure chamber 37a by the hydraulic oil inside the cylinder body 371.

The piston 372 has a hollow rod section 372a (the first piston rod of the present invention) having its distal end closed and its proximal end opened. The rod section 372a has a length corresponding to the entire length of the cylinder body 371, and its peripheral wall is configured to have an outer diameter which comes in sliding contact with the inner diameter of the cylinder body 371. A rubber gasket 372b is provided at the distal end of the rod section 372a.

From one end, which is open, of the rod section 372a of the piston 372, a ball screw 38 is inserted along the axis line of the rod section 372a, and a nut 39 is fixedly mounted on the rod section 372a so as to be screwed with the ball screw 38. The ball screw 38 is rotationally driven by a motor 40 (the rotary drive unit of the present invention) to cause the piston 372 to advance and retract via the nut 39. The motor 40 is provided with an encoder 41 for detecting the amount of actuation.

The motor 40 rotationally drives the ball screw 38 via a belt 44 looped over pulleys 42 and 43 which serve as a rotation transmit unit. With this arrangement, an output shaft 401 of the motor 40 comes parallel to the axis line of the rod section 372a, enabling the motor 40 to be placed adjacent to the cylinder body 371, thereby permitting a compact construction.

The driving fluid pressure cylinder 37 is arranged in a posture where the piston 372 refracts in an upward direction with the above-described one end of the cylinder body 371 being on the upper side (i.e., the posture where the pressure chamber 37a is located on the lower side). A guide element 373 for guiding the piston 372 that has retracted to the upper side is provided consecutively to the driving fluid pressure cylinder 37. The guide element 373 guides the piston 372 in the up-and-down directions and in a non-rotatable state. Provided consecutively to the upper end of the guide element 373 is a support element 46 which rotatably supports the ball screw 38 via a bearing 45.

Between the guide element 373 and the cylinder body 371, a joining block 374 is integrally provided to join the guide element 373 to the cylinder body 371. The joining block 374 has a ring-shaped seal element 47 which is in contact with the outer periphery of the piston 372 for sealing. With this arrangement, even while the piston 372 is advancing or retracting, the sealed state of the cylinder body 371 is reliably maintained by the seal element 47. This improves airtightness of the cylinder body 371, permitting efficient generation of the hydraulic oil pressure.

Further, on the inner peripheral surface of the joining block 374, a receiving section 374a is formed, which has an inner diameter greater than that of the cylinder body 371 and is configured to receive a distal end portion of the piston 372 when the piston 372 retracts toward the upper end of the cylinder body 371. At the upper end of the cylinder body 371, a taper section 37b is formed which continues from the pressure chamber 37a of the cylinder body 371 to the receiving section 374a, with its diameter gradually changed. The receiving section 374a creates a space "s" between the same and the piston 372. When the distal end portion of the piston 372 is received in the receiving section 374a, the pressure chamber 37a of the cylinder body 371 communicates with the space "s" between the receiving section 374a and the piston 372 via the taper section 37b.

The driving cylinder unit 35 has a fluid storage tank 48 which is connected to each of the driving fluid pressure cylinders 37. The fluid storage tank 48 stores the hydraulic oil (liquid fluid) used as the working fluid. The receiving section 374a is provided with a through hole 374b which is connected to the fluid storage tank 48 via a first pipe 481 to let the hydraulic oil flow therethrough, and an air bleeding hole 374c which is formed above the through hole 374b to let out the air inside the cylinder body 371 from the receiving section 374a. The air bleeding hole 374c is connected to the fluid storage tank 48 via a second pipe 482. The first pipe 481 is connected to the hydraulic oil storage portion in the fluid storage tank 48, while the second pipe 482 is connected to the air pocket above the hydraulic oil in the fluid storage tank 48.

A total of thirteen driving fluid pressure cylinders 37 are provided in the driving cylinder unit 35 corresponding respectively to the above-described driven fluid pressure cylinders 23, 24, 28, 29, 30, and 34, which are installed in the hand body 2. As schematically illustrated in FIG. 1, the driving fluid pressure cylinders 37 in the driving cylinder unit 35 are separately connected to the corresponding driven fluid pressure cylinders 23, 24, 28, 29, 30, and 34 in the hand body 2 via fluid pressure transmission pipes 45.

The controller 36, as shown in FIG. 1, is connected to the driving cylinder unit 35 via a signal line 46, to control bending and stretching of the finger mechanisms by adjusting the working fluid pressures transmitted from the driving fluid pressure cylinders 37 to the corresponding driven fluid pressure cylinders 23, 24, 28, 29, 30, and 34.

Further, the controller 36 is connected to the hand body 2 via a signal line 47, to control the driving fluid pressure cylinders 37 on the basis of the information obtained from the six-axis force sensors 21 provided in the dexterous fingers, i.e. the thumb mechanism 5, the index finger mechanism 6, and the middle finger mechanism 7, as well as from the aforementioned touch sensors. In this manner, the controller 36 controls such that the finger mechanisms of the hand body 2 with the above-described configurations perform the grasping operation mimicking the human operation.

In the present embodiment, the controller 36 detects both of an output fluid pressure of each driving fluid pressure cylinder 37 and an input fluid pressure to each driven fluid pressure cylinder (23, 24 . . . ). That is, as shown in FIG. 7, at a fluid port 375 formed at the pressure chamber 37a of the driving fluid pressure cylinder 37, a first pressure sensor 48 is provided to measure the output fluid pressure generated in the pressure chamber 37a.

Further, as shown in FIG. 4, in the vicinity of a fluid port 235 formed at a pressure chamber 234 of the first driven fluid pressure cylinder 23, a second pressure sensor 49 is provided to measure the input fluid pressure applied to the pressure chamber 234.

Although not shown in the figure, the second driven fluid pressure cylinder 24 and the other driven fluid pressure cylinders provided in the finger mechanisms are each provided with the second pressure sensor for measuring the input fluid pressure applied thereto.

Figure 8:
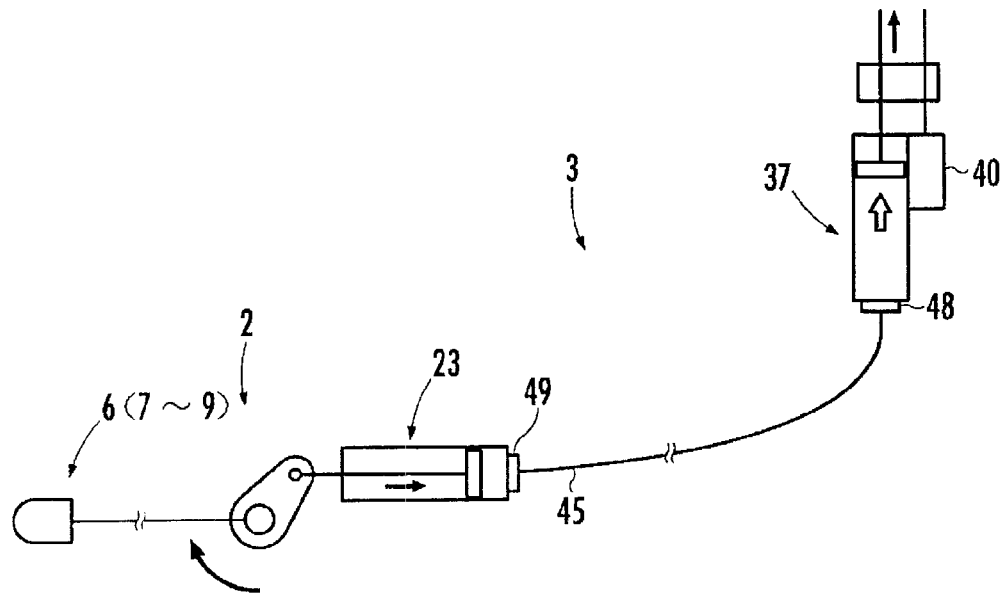
FIG. 8 schematically illustrates how the drive unit works.
Figure 8:
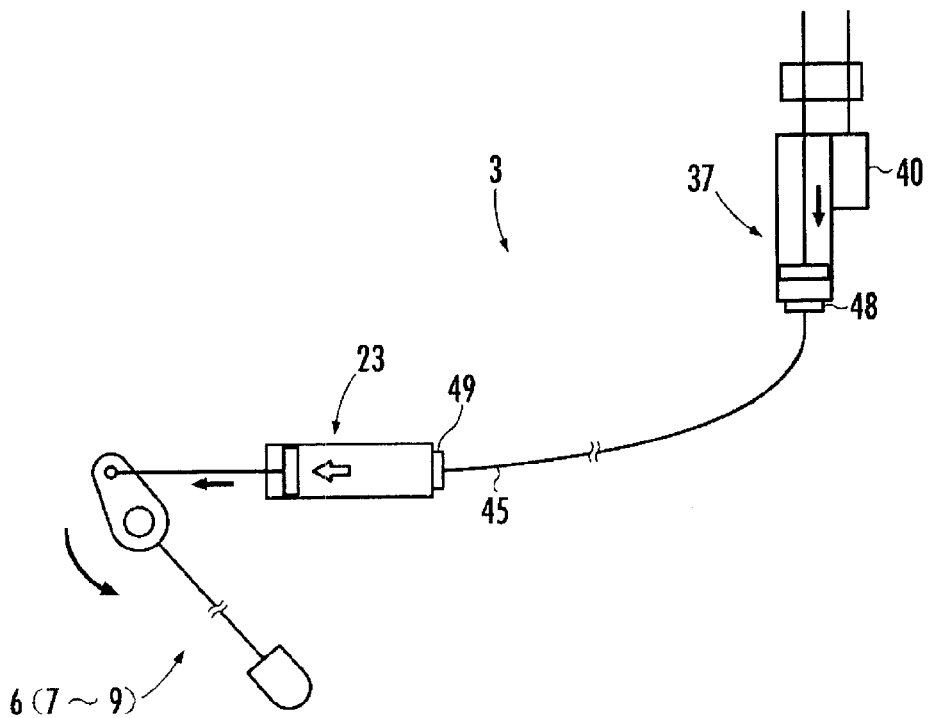

With this configuration, as schematically illustrated in FIGS. 8 (*a*) and (*b*), when a fluid is delivered from or sucked into the driving fluid pressure cylinder 37, the fluid is injected to or discharged from the corresponding driven fluid pressure cylinder 23 (24, 28, 29, 30, or 34), whereby the finger mechanism 6 (7, 8, 9, or 5) is driven by the driving fluid pressure cylinder 37.

At this time, in the event that air is inadvertently mixed in the interior of the fluid pressure transmission pipe 45 or in the event that the diameter of the fluid pressure transmission pipe 45 is changed by expansion or contraction thereby causing a change in flow resistance of the fluid, there may be a difference between the output fluid pressure from the driving fluid pressure cylinder 37 and the input fluid pressure to the corresponding driven fluid pressure cylinder (23, 24 . . . ).

The controller 36 checks the fluid pressures measured by the first pressure sensor 48 and the second pressure sensor 49 to detect a deterioration of responsiveness which is for example due to the air mixing in the fluid flow path or due to the change in flow resistance of the fluid with the expansion/contraction of the diameter of the fluid pressure transmission pipe 45. Then, in accordance with the detection, the controller 36 corrects the fluid delivery and suction amounts at the driving fluid pressure cylinder 37 via the motor 40, to thereby recover the responsiveness.

This ensures that sufficient input fluid pressures are applied to the driven fluid pressure cylinders 23, 24, and others, to actuate the finger mechanisms 6 (7, 8, 9, and 5) to bend and stretch as desired.

With the driving cylinder unit 35 provided outside the hand body 2, the hand body 2 is compact in size and light in weight.

It is thus possible to provide the hand body 2 which is approximately equal in size to a typical human hand, for example.

Further, the finger mechanisms 5, 6, 7, 8, and 9 are each actuated by the fluid pressures of the driving fluid pressure cylinders 37 and the driven fluid pressure cylinders 23, 24, 28, 29, 30, and 34. This guarantees a sufficiently large grasping force despite the compact design.

Furthermore, as shown in FIG. 7, the cylinder body 371 of the driving fluid pressure cylinder 37 is provided in a posture where the pressure chamber 37a is located on the lower side. Therefore, in case that the air mixed in the hydraulic oil enters into the cylinder body 371, the air moves upward in the cylinder body 371. When the piston 372 is retracted such that its distal end is received in the receiving section 374a, the air in the pressure chamber 37a of the cylinder body 371 moves via the taper section 37b into the spaces between the receiving section 374a and the piston 372, and is discharged from the air bleeding hole 374c into the air pocket in the fluid storage tank 48.

Then, as the piston 372 is moved downward, the distal end of the piston 372 enters through the taper section 37b into the pressure chamber 37a of the cylinder body 371, so that the hydraulic oil pressure is obtained reliably by the pressure chamber 37a with the air discharged therefrom. Moreover, when the piston 372 enters through the taper section 37b into the pressure chamber 37a, the receiving section 374a attains a negative pressure, causing the hydraulic oil in the fluid storage tank 48 to be sucked into the receiving section 374a, so that the receiving section 374a is filled with the hydraulic oil. This avoids a reduction in filled amount of the hydraulic oil inside the cylinder body 371 due to the expelled air.

For example in the case of causing the finger mechanisms of the hand body 2 to pick up a cylindrical object (not shown), the controller 36 controls the finger mechanisms in the following manner.

Firstly, the dexterous fingers, i.e. the thumb mechanism 5, the index finger mechanism 6, and the middle finger mechanism 7, are caused to perform an operation of pinching the object with their fingertips.

At this time, as the axis line "a" of the rotary shaft of the CM2 joint 20 (the cylinder body 291) (see FIG. 2) is set to extend centrally through between the metacarpophalangeal joint of the index finger mechanism 6 and that of the middle finger mechanism 7, the fingertip of the thumb mechanism 5 smoothly opposes the position between the fingertips of the index finger mechanism 6 and the middle finger mechanism 7. This highly stabilizes the object pinching state.

Subsequently, the thumb mechanism 5, the index finger mechanism 6, and the middle finger mechanism 7 are caused to grasp the object until the object touches the base skin element 12 on the palm side. At this time, the controller 36 calculates the location, size, posture and others of the object on the basis of the information received from the six-axis force sensors 21 as well as from the touch sensors placed on the finger skin elements 11 on the finger pad sides and the base skin element 12 on the palm side. The controller 36 operates the thumb mechanism 5, the index finger mechanism 6, and the middle finger mechanism 7 on the basis of the calculation results, allowing them to dexterously manipulate the posture of the object, while balancing the same, as they uninterruptedly shift from the pinching operation to the grasping operation.

Moreover, as the axis line "a" of the rotary shaft of the CM2 joint 20 (the cylinder body 291) is located centrally between the metacarpophalangeal joint of the index finger mechanism 6 and that of the middle finger mechanism 7, an unnecessary moment would not be generated, whereby the posture of the object can be stabilized even during the transition to the grasping operation.

Subsequently, the controller 36 actuates the ring finger mechanism 8 and the little finger mechanism 9 to cause the ring finger mechanism 8 and the little finger mechanism 9 considered as the force fingers to grip the object with a relatively strong force. Thereafter, the thumb mechanism 5, the index finger mechanism 6, and the middle finger mechanism 7 grip the object with a relatively strong force.

The above-described operations are performed under the control of the controller 36, to enable the object grasping operation mimicking that of a human being. Further, the finger mechanisms are given separate roles as the dexterous fingers and the force fingers. Therefore, it is only necessary to provide the six-axis force sensors 21 to the thumb mechanism 5, the index finger mechanism 6, and the middle finger mechanism 7, which are the dexterous fingers, while the ring finger mechanism 8 and the little finger mechanism 9 can be made small in size and light in weight.

Industrial Applicability

The five-fingered hand device according to the present invention permits reduction in size and weight while implementing operations similar to those of a human hand and providing a sufficiently large grasping force, so that is is suitably applicable to a humanoid robot.

The invention claimed is:

1. A five-fingered hand device including a hand body mimicking a human hand and a drive unit, the hand body including a base having a palm and a back, and a thumb mechanism, an index finger mechanism, a middle finger mechanism, a ring finger mechanism, and a little finger mechanism corresponding respectively to a human five fingers and each having bending and stretching functions, the drive unit driving the five finger mechanisms of the hand body independently of each other, wherein
the drive unit comprises:
a plurality of driven fluid pressure cylinders installed in the hand body and actuating the finger mechanisms to bend and stretch independently of each other;
a plurality of driving fluid pressure cylinders placed outside the hand body and connected via fluid pressure transmission pipes to the driven fluid pressure cylinders, respectively, the driving fluid pressure cylinders applying working fluid pressures to the driven fluid pressure cylinders independently of each other; and
a control unit configured to adjust the working fluid pressures transmitted from the driving fluid pressure cylinders to the corresponding driven fluid pressure cylinders, to thereby control the bending and stretching of the finger mechanisms,
the thumb mechanism and one or both of the index finger mechanism and the middle finger mechanism are considered as dexterous fingers which are each provided with a force sensor configured to detect a force acting on a fingertip portion thereof and which are caused by the control unit to perform a dexterous operation including a pinching operation with the fingertips,
the finger mechanisms other than the dexterous fingers are considered as force fingers which are caused by the control unit to perform a force operation including a gripping operation in response to the operation of the dexterous fingers,
metacarpophalangeal joints of the four finger mechanisms other than the thumb mechanism each include a first rotary shaft having an axis line parallel to a rotary shaft of a proximal interphalangeal joint and a second rotary shaft having an axis line crossing the axis line of the first rotary shaft, the metacarpophalangeal joint of the finger mechanism considered as the dexterous finger has both rotary shafts joined to piston rods of the different driven fluid pressure cylinders separately, and the metacarpophalangeal joint of the finger mechanism considered as the force finger has only the first rotary shaft joined to a piston rod of the driven fluid pressure cylinder, with the second rotary shaft rotating freely in accordance with the force operation.

2. The five-fingered hand device according to claim 1, wherein each of the plurality of driving fluid pressure cylinders includes a first cylinder body which contains a fluid therein, a hollow first piston rod inserted into the first cylinder body from one end thereof and capable of advancing and retracting therein, a first piston provided consecutively to the first piston rod, a seal member which seals the first cylinder body while permitting advancing and retracting movement of the first piston, a ball screw inserted into the first piston rod along an axis line of the first piston rod, a nut fixedly secured to the first piston rod and screwed with the ball screw, and a rotary drive unit which rotationally drives the ball screw to cause the first piston rod to advance and retract via the nut, and each of the plurality of driven fluid pressure cylinders includes a second cylinder body which is supplied with a working fluid from the driving fluid pressure cylinder, a second piston which is reciprocally movable in the second cylinder body, and a second piston rod which is provided consecutively to the second piston and advances and retracts in accordance with the reciprocating motion of the second piston.

3. The five-fingered hand device according to claim 2, wherein the rotary drive unit is provided adjacent to the first cylinder body in a posture where an output shaft thereof that outputs rotation is in parallel with an axis line of the first piston, and the output shaft is connected to the ball screw via a rotation transmit unit.

4. The five-fingered hand device according to claim 1, wherein the drive unit includes a first pressure sensor which measures an output fluid pressure output from the driving fluid pressure cylinder to the fluid pressure transmission pipe, and a second pressure sensor which measures an input fluid pressure input from the fluid pressure transmission pipe to the driven fluid pressure cylinder, and the control unit controls the bending and stretching of the finger mechanism by adjusting the working fluid pressure of the driving fluid pressure cylinder on the basis of the measurement results of the first and second pressure sensors.

5. The five-fingered hand device according to claim 1, wherein the four finger mechanisms other than the thumb mechanism each include a distal interphalangeal joint which rotates in one axis, the proximal interphalangeal joint which rotates in one axis about an axis line parallel to a rotary shaft of the distal interphalangeal joint, and the metacarpophalangeal joint which rotates in two axes about the axis line of the first rotary shaft and the axis line of the second rotary shaft, the distal interphalangeal joint is joined via a link mechanism to the proximal interphalangeal joint so as to move in linkage with the rotation of the proximal interphalangeal joint, and the proximal interphalangeal joint and the metacarpophalangeal joint are joined to piston rods of the different driven fluid pressure cylinders separately, so as to rotate in accordance with extension and retraction of the corresponding piston rods.

6. The five-fingered hand device according to claim 5, wherein the driven fluid pressure cylinder for rotating the proximal interphalangeal joint is arranged between the proximal interphalangeal joint and the metacarpophalangeal joint, and the driven fluid pressure cylinder for rotating the metacarpophalangeal joint is arranged in the base.

7. The five-fingered hand device according to claim 1, wherein the thumb mechanism includes a thumb interphalangeal joint which rotates in one axis, a thumb metacarpophalangeal joint which rotates in one axis about an axis line parallel to a rotary shaft of the thumb interphalangeal joint, and a carpometacarpal joint which rotates in two axes about an axis line parallel to a rotary shaft of the thumb metacarpophalangeal joint and an axis line crossing that axis line, the thumb interphalangeal joint is joined via a link mechanism to the thumb metacarpophalangeal joint so as to move in linkage with the rotation of the thumb metacarpophalangeal joint, and the thumb metacarpophalangeal joint and the carpometacarpal joint are joined to piston rods of the different driven fluid pressure cylinders separately, so as to rotate in accordance with extension and retraction of the corresponding piston rods.

8. The five-fingered hand device according to claim 7, wherein the driven fluid pressure cylinder for rotating the thumb metacarpophalangeal joint is arranged between the thumb metacarpophalangeal joint and the carpometacarpal joint, and the driven fluid pressure cylinder for rotating the carpometacarpal joint is arranged in the base.

9. A five-fingered hand device includinq a hand body mimicking a human hand and a drive unit, the hand body including a base having a palm and a back, and a thumb mechanism, an index finger mechanism, a middle finger mechanism, a ring finger mechanism, and a little finger mechanism corresponding respectively to a human five fingers and each having bending and stretching functions, the drive unit driving the five finger mechanisms of the hand body independently of each other, wherein the drive unit comprises:

a plurality of driven fluid pressure cylinders installed in the hand body and actuating the finger mechanisms to bend and stretch independently of each other;

a plurality of driving fluid pressure cylinders placed outside the hand body and connected via fluid pressure transmission pipes to the driven fluid pressure cylinders, respectively, the driving fluid pressure cylinders applying working fluid pressures to the driven fluid pressure cylinders independently of each other; and a control unit configured to adjust the working fluid pressures transmitted from the driving fluid pressure cylinders to the corresponding driven fluid pressure cylinders, to thereby control the bending and stretching of the finger mechanisms, each of the plurality of driving fluid pressure cylinders includes
a first cylinder body which contains a fluid therein,
a hollow first piston rod inserted into the first cylinder body from one end thereof and capable of advancing and retracting therein,
a first piston provided consecutively to the first piston rod,
a seal member which seals the first cylinder body while permitting advancing and retracting movement of the first piston,
a ball screw inserted into the first piston rod along an axis line of the first piston rod,
a nut fixedly secured to the first piston rod and screwed with the ball screw, and
a rotary drive unit which rotationally drives the ball screw to cause the first piston rod to advance and retract via the nut, each of the plurality of driven fluid pressure cylinders includes
a second cylinder body which is supplied with a working fluid from the driving fluid pressure cylinder,
a second piston which is reciprocally movable in the second cylinder body, and
a second piston rod which is provided consecutively to the second piston and advances and retracts in accordance with the reciprocating motion of the second piston, the drive unit uses a liquid fluid as the working fluid and has a fluid storage tank for storing the liquid fluid therein, the driving fluid pressure cylinder is arranged in a posture where the first piston retracts in an upward direction with the one end of the first cylinder body being on an upper side, the first cylinder body has a receiving section at an upper end thereof, the receiving section being configured to receive a distal end of the retracted first piston in a non-contact state, and the receiving section has a through hole and an air bleeding hole, the through hole being connected to the fluid storage tank to let the liquid fluid flow therethrough, the air bleeding hole being formed above the through hole to expel air out of the first cylinder body.

10. A five-fingered hand device including a hand body mimicking a human hand and a drive unit, the hand body including a base having a palm and a back, and a thumb mechanism, an index finger mechanism, a middle finger mechanism, a ring finger mechanism, and a little finger mechanism corresponding respectively to a human five fingers and each having bending and stretching functions, the drive unit driving the five finger mechanisms of the hand body independently of each other,
wherein
the drive unit comprises:

a plurality of driven fluid pressure cylinders installed in the hand body and actuating the finger mechanisms to bend and stretch independently of each other;

a plurality of driving fluid pressure cylinders placed outside the hand body and connected via fluid pressure transmission pipes to the driven fluid pressure cylinders, respectively, the driving fluid pressure cylinders applying working fluid pressures to the driven fluid pressure cylinders independently of each other; and a control unit configured to adjust the working fluid pressures transmitted from the driving fluid pressure cylinders to the corresponding driven fluid pressure cylinders, to thereby control the bending and stretching of the finger mechanisms, each of the plurality of driving fluid pressure cylinders includes
a first cylinder body which contains a fluid therein,
a hollow first piston rod inserted into the first cylinder body from one end thereof and capable of advancing and retracting therein,
a first piston provided consecutively to the first piston rod,
a seal member which seals the first cylinder body while permitting advancing and retracting movement of the first piston,
a ball screw inserted into the first piston rod along an axis line of the first piston rod,
a nut fixedly secured to the first piston rod and screwed with the ball screw, and
a rotary drive unit which rotationally drives the ball screw to cause the first piston rod to advance and retract via the nut, each of the plurality of driven fluid pressure cylinders includes
a second cylinder body which is supplied with a working fluid from the driving fluid pressure cylinder,
a second piston which is reciprocally movable in the second cylinder body, and
a second piston rod which is provided consecutively to the second piston and advances and retracts in accordance with the reciprocating motion of the second piston, the second piston rod of the driven fluid pressure cylinder is formed of a metal, and the second piston of the driven fluid pressure cylinder is formed of a synthetic resin, the second piston rod and the second piston are joined together as a ball section formed at a proximal end portion of the second piston rod is fitted in a spherical receiving section formed at the second piston, and the second piston has an outer peripheral surface provided with a recess extending in a circumferential direction thereof, the recess being formed at least at a portion where an outer surface of the ball section fitted in the spherical receiving section comes closest to an inner surface of the second cylinder body.

11. A five-fingered hand device includinq a hand body mimicking a human hand and a drive unit, the hand body including a base having a palm and a back, and a thumb mechanism, an index finger mechanism, a middle finger mechanism, a ring finger mechanism, and a little finger mechanism corresponding respectively to a human five fingers and each having bending and stretching functions, the drive unit driving the five finger mechanisms of the hand body independently of each other,
wherein
the drive unit comprises:

a plurality of driven fluid pressure cylinders installed in the hand body and actuating the finger mechanisms to bend and stretch independently of each other:

a plurality of driving fluid pressure cylinders placed outside the hand body and connected via fluid pressure transmission pipes to the driven fluid pressure cylinders, respectively, the driving fluid pressure cylinders applying working fluid pressures to the driven fluid pressure cylinders independently of each other; and a control unit configured to adjust the working fluid pressures transmitted from the driving fluid pressure cylinders to the corresponding driven fluid pressure cylinders, to thereby control the bending and stretching of the finger mechanisms, the thumb mechanism includes a thumb interphalangeal joint which rotates in one axis, a thumb metacarpophalangeal joint which rotates in one axis about an axis line parallel to a rotary shaft of the thumb interphalangeal joint, and a carpometacarpal joint which rotates in two axes about an axis line parallel to a rotary shaft of the thumb metacarpophalangeal joint and an axis line crossing that axis line, the thumb interphalangeal joint is joined via a link mechanism to the thumb metacarpophalangeal joint so as to move in linkage with the rotation of the thumb metacarpophalangeal joint, the thumb metacarpophalangeal joint and the carpometacarpal joint are joined to piston rods of the different driven fluid pressure cylinders separately, so as to rotate in accordance with extension and retraction of the corresponding piston rods, the driven fluid pressure cylinder for rotating the thumb metacarpophalangeal joint is arranged between the thumb metacarpophalangeal joint and the carpometacarpal joint, the driven fluid pressure cylinder for rotating the carpometacarpal joint is arranged in the base, the carpometacarpal joint includes a first rotary shaft having an axis line parallel to the rotary shaft of the thumb metacarpophalangeal joint and a second rotary shaft having an axis line crossing the axis line of the first rotary shaft, the first and second rotary shafts being joined to piston rods of the different driven fluid pressure cylinders separately, the second rotary shaft is hollow and arranged in the base, and the driven fluid pressure cylinder for rotating the first rotary shaft is housed inside the second rotary shaft.

12. The five-fingered hand device according to claim 11, wherein a coil spring is provided which biases against a driving direction by the driven fluid pressure cylinder which rotates the second rotary shaft, and the second rotary shaft is arranged inside the coil spring.

13. The five-fingered hand device according to claim 11, wherein the second rotary shaft of the carpometacarpal joint of the thumb mechanism is arranged such that an axis line of the second rotary shaft extends through between a metacarpophalangeal joint of the index finger mechanism and a metacarpophalangeal joint of the middle finger mechanism.

* * * * *